July 12, 1938.  H. D. AYARS  2,123,223
DISPENSING DEVICE
Filed Oct. 4, 1937   3 Sheets-Sheet 1
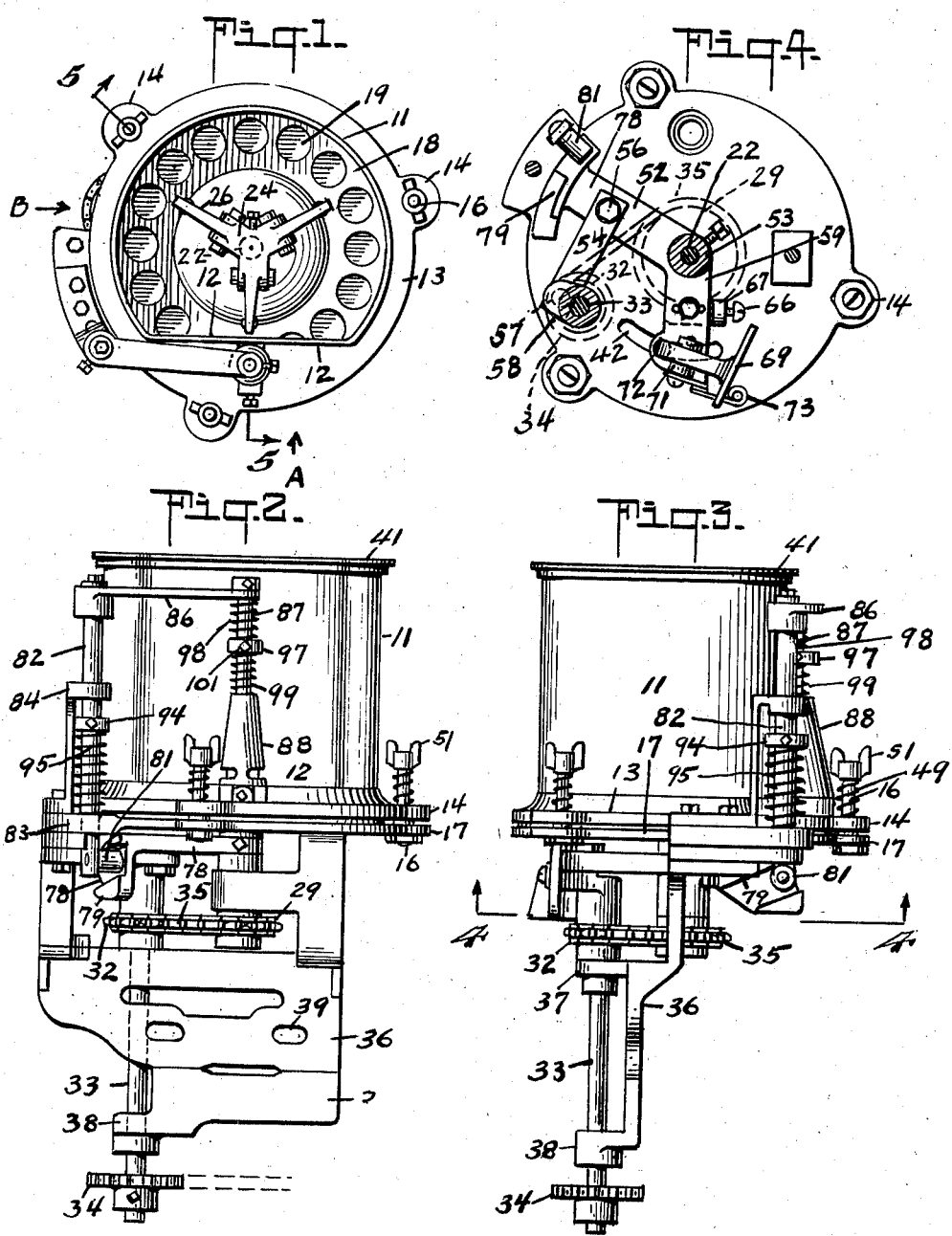
INVENTOR
HARRY D. AYARS.
BY
ATTORNEY

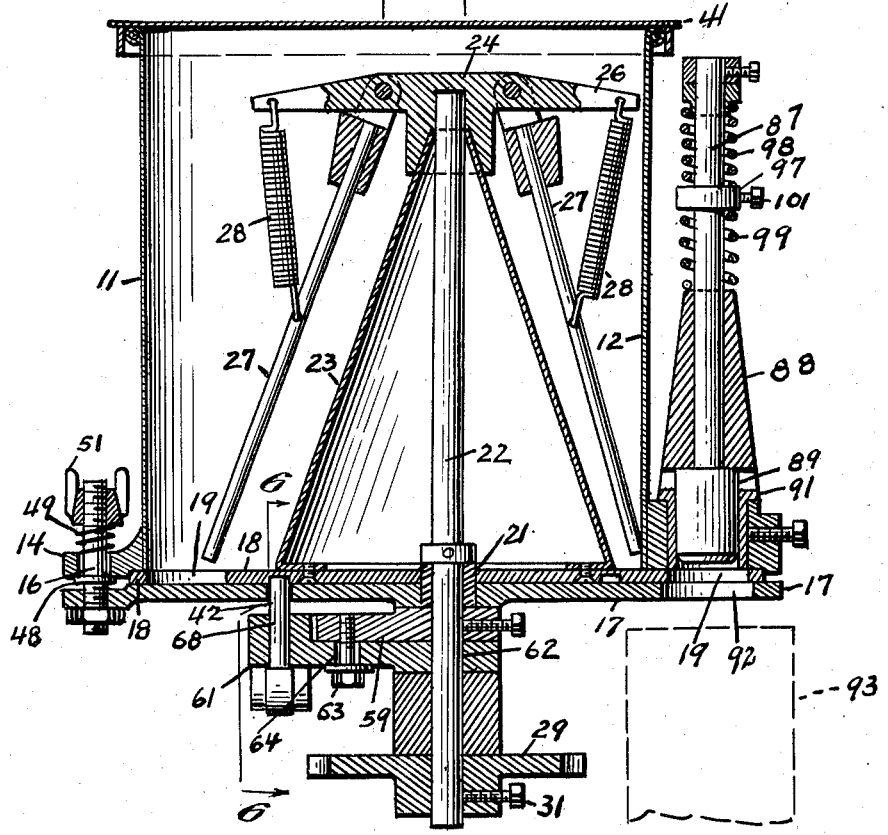
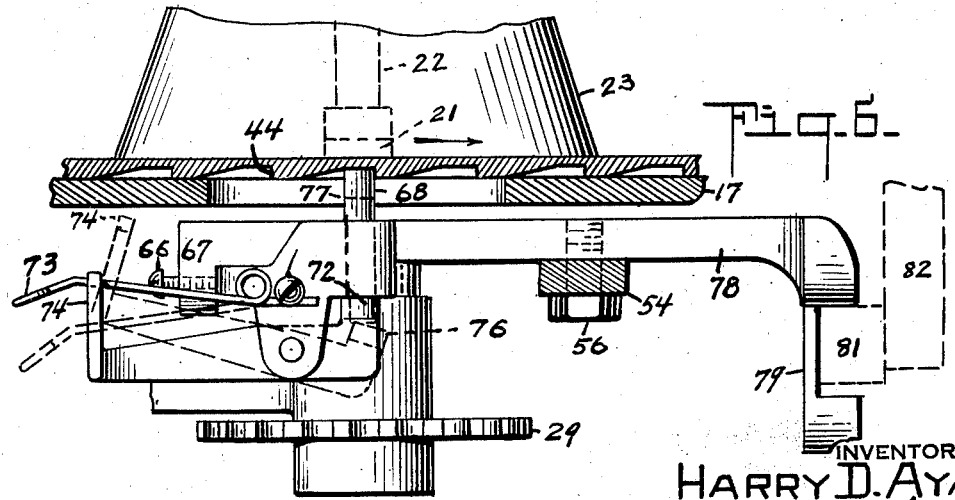

July 12, 1938.　　　H. D. AYARS　　　2,123,223
DISPENSING DEVICE
Filed Oct. 4, 1937　　　3 Sheets-Sheet 3
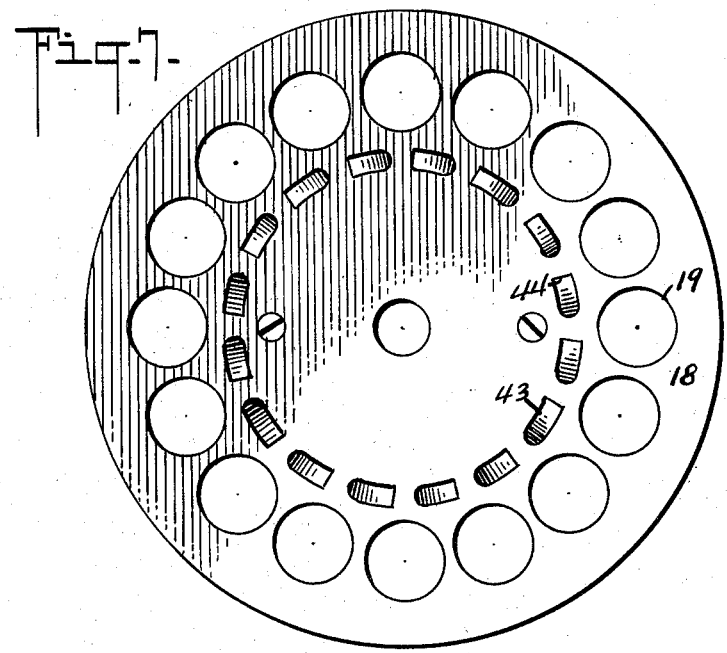
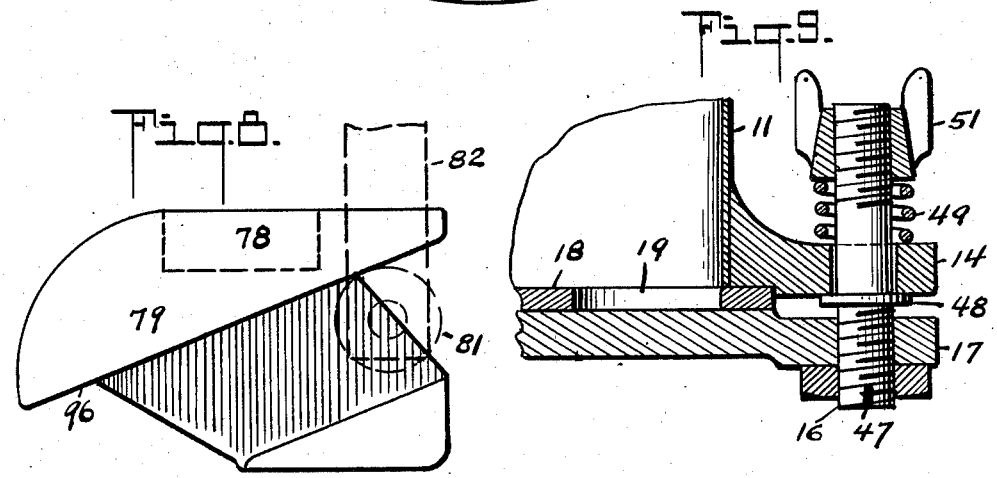
INVENTOR
HARRY D. AYARS.
BY
ATTORNEY Patented July 12, 1938

2,123,223

UNITED STATES PATENT OFFICE 2,123,223

DISPENSING DEVICE

Harry D. Ayars, Philadelphia, Pa.

Application October 4, 1937, Serial No. 167,224

20 Claims. (Cl. 221—102)

This invention relates to a dispensing device, and has special reference to a dispensing device for depositing measured quantities of granular or powdered material, as desired.

The object of the invention is to provide a dispensing device which will accurately measure and deposit granular or powdered material in timed succession, as desired.

Another object of the invention is to provide in a device of the above type means whereby the delivery of the material may be suspended without disconnecting the device.

A still further object of the invention is to provide a device of the above type with agitator means to insure capacity measuring for each deposit.

According to the invention, the device comprises a container or hopper for the material, a base plate beneath said hopper provided with a discharge opening, a disk provided with cups for measuring the material to be deposited, a main shaft for connection with the source of power, a central shaft, drive means between said shafts, a bell crank pivoted on the central shaft, a crank on the main shaft for rocking the bell crank, means on one end of the bell crank for intermittently bringing the measuring cups into registration with the discharge opening, means on the other end of said bell crank for forcing the material from the cup through the discharge opening, and means on the central shaft, and within said hopper for agitating the material to insure a capacity fill in each measuring cup.

The drawings illustrate an embodiment of the invention, and the views therein are as follows:—

Figure 1 is a top plan view of the device with the hopper cover removed,

Figure 2 is a side elevation looking in the direction of the arrow "A",

Figure 3 is a side elevation looking in the direction of the arrow "B",

Figure 4 is a longitudinal sectional view taken on the line 4—4 of Figure 3, and looking in the direction of the arrows, Figure 5 is a vertical sectional view taken on the line 5—5 of Figure 1, Figure 6 is a fragmentary vertical sectional view taken on the line 6—6 of Figure 5, and looking in the direction of the arrows, Figure 7 is a bottom plan view of the measuring disk, Figure 8 is an enlarged detailed end view of the cam race employed for operating the plunger which forces the measured material from the measuring cups, and Figure 9 is an enlarged fragmentary sectional view showing the manner in which the hopper is connected with the base plate to permit rotation of the measuring disk.

As illustrated in the drawings, the hopper 11 has a corded section 12, and this hopper may be formed from sheet metal, as shown in Figure 5. At the bottom of the hopper is a flange casting 13 provided with ears 14 for receiving bolts 16 which connect said hopper with the base plate 17. Between the flange casting 13 and base plate 17 is a disk 18 which is provided with measuring cups 19. This disk is secured to a hub 21 which is freely rotatable on a central shaft 22, and it is provided at its center and about the shaft 22 with a conical partition 23 which has its greatest diameter adjacent said plate, and its smallest diameter approximately the diameter of the shaft 22 and at a point near the upper end of said shaft. The upper end of the shaft 22 is provided with an agitator frame 24 which has extending arms 26, and at the inner end of these arms, agitating fingers 27 are pivotally mounted, while spiral springs 28 are positioned at the outer ends of said arms and intermediate the ends of said fingers, so that the lower end of said fingers is yieldingly urged outward.

The shaft 22 has a chain gear 29 secured thereto by the set screw 31, and this gear is connected with a chain gear 32 on a main shaft 33 by means of a chain 35. The shaft 33 is provided with a chain gear 34, or with other means as desired, for connection with a source of power. The device illustrated and shown herein is adapted for connection with a machine for filling cans with tomatoes, and the casting 36 having the bearings 37 and 38 for the shaft 33 is provided with slotted holes 39 for connection with the tomato filling machine, and the shaft 33 is intended to be driven from any suitable driving means on the tomato filling machine.

The hopper 11 is provided with a cover 41 which fits down over the beading on the same, as shown in Figure 5. The base plate 17 is provided with an arcuate slot 42 extending entirely through the same, while the disk 18 is provided with a rack 43 having the same number of teeth 44 as the number of measuring pockets 19.

It will be understood that the disk 18 may be of any desired thickness, so that the capacity of the measuring cups may be altered at will. This is accomplished readily by removing the fastening means between the flange casting 13 and base plate 17, and inserting the disk desired.

The connecting means between the flange casting 13 and base plate 17 is shown in detail in Figure 9. The disk 18 must be free to rotate. The connecting means consists of a screw 46 having a screw driver slot 47 in its lower end, and provided intermediate its ends with a shoulder 48. Above the ear 14, the screw is surrounded with a small spiral spring 49 while a wing nut 51 is threaded onto the upper end of said screw, so that any amount of pressure desired may be exerted thereon without changing the relative distance between the flange casting 13 and base plate 17. By this arrangement, the disk 18 is always free to rotate without permitting any space for the escape of material between the flange and base plate.

The central shaft 22 has a bell crank 52 pivotally mounted thereon by its hub 53. This bell crank has a link 54 pivoted at 56 and pivotally connected at 57 with a crank 58 on the drive shaft 33, so that said bell crank is rocked by the rotation of said drive shaft. One arm 59 of said bell crank connects with a casting 61, which is also pivotally mounted at 62, on the central shaft 22 (see Figure 5). These parts are connected by means of a set screw 63 extending through a slot 64 in said casting, while relative position between said bell crank arm 59 and casting 61 is obtained by means of the set screw 66 extending through the lug 67 on said arm.

The casting 61 is provided with a pin 68 extending through the same, while a trigger 69 is pivoted between the lugs 71, and has its forward end 72 pressed upward against said pin by virtue of the spring 73, so that said pin is forced up into the tooth 44, as shown in Figure 6, when said parts are in registry. The outer end of the spring 73 may be retained at the upper end of the ledge 74 on said trigger so as to force the forward end 72 thereof firmly against said pin 68, as hereinbefore described, or it may be passed down from said ledge, as shown by dotted lines in Figure 6, so as to permit the forward end of said trigger to drop, as shown at 76 in Figure 6. The pin 68 will, therefore, drop, so that its upper end will be at the line 77 shown in Figure 6 and out of contact with the rack 43 on the bottom of the disk 18. The other arm 78 of the bell crank 52 is provided with a cam race 79. This cam race engages a roller 81 mounted on the bottom end of a shaft 82. This shaft is journaled at 83 and 84, and its upper end is provided with a link 86 which extends to and connects the upper end of a plunger shaft 87. This plunger shaft is shown in detail in Figure 5. The plunger shaft extends down through a conical bearing 88 and is provided at its lower end with a plunger 89. The plunger bar may be lined as shown at 91 and the bell crank 52 is so timed that the shaft 82, and consequently, the shaft 87, are pulled downward by the cam race 79 when a measuring pocket 19 of the disk 18 is in registry with the discharge opening 92 of the base plate 17, so that the plunger 89 is pushed downward and forces the material from the measuring pocket 19 into the receptacle 93. The shaft 82 is provided with a collar 94 and a spiral spring 95 surrounds said shaft between said collar and the bearing housing 83, so that the roller 81 under operating conditions is always maintained in contact with the cam face 96. The shaft 87 has a collar 97 and a spiral spring 98 surrounds said shaft between said collar and the link 86, while a spiral spring 99 surrounds said shaft between said collar and the conical bearing 88.

The collar 97 may be adjusted, as desired, to provide the proper amount of tension to force the plunger completely through the cups in disks of different thicknesses, and when adjusted it may be held securely in place by means of the set screw 101. With the springs arranged as shown an equalizing tension is provided thereon and the plunger, which is forced down against the disk before the cup is aligned with the discharge opening will ride upon the upper surface of the disk, and when the same registers with the discharge opening, the springs will "snap" the same therethrough, thus forcing all the material from the cup.

The machine here illustrated and described is capable of measuring and depositing any granular or powdered materials in exact quantities, and while it has been herein suggested that the same may be applied to a machine for filling cans with tomaties, it will be understood that the machine may be used for any purposes where its functions are desired.

It will be understood that when the agitator fingers 27 come into contact with the corded part 12 of the hopper that they will be swung backward, as shown in Figure 5, placing tension on the spring 28, and as soon as they leave the corded part of said hopper, and return to the regular arcuate part of said hopper, they will assume their full outward swing, thereby substantially undermining the material in the hopper and insuring the complete filling of each of the measuring cups.

It will be noted that the agitating fingers rotate in the opposite direction to the measuring disk which insures an even distribution of material into the cups and a complete discharge of all material from the hopper.

The machine in its construction is full-floating so that the same may be taken apart for cleaning or for the renewal of any worn or broken parts, and this may be done quickly and conveniently by unskilled workmen.

Of course, the dispensing device illustrated and described herein may be modified and changed in various ways without departing from the invention herein set forth and hereafter claimed.

The invention is hereby claimed as follows:—

1. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, means for rocking said bell crank, means operated by one arm of said bell crank to intermittently rotate said disk to progressively register the measuring cups with said discharge port, and means operated by the other arm of said bell crank to operate said plunger.

2. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means operated by one arm of said bell crank to intermittently rotate said disk to progressively register the measuring cups with said discharge port, and means operated by the other arm of said bell crank to operate said plunger.

3. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, means for rocking said bell crank, means comprising a spring-pressed pawl operated by one arm of said bell crank to intermittently rotate said disk to progressively register the measuring cups with said discharge port, and means operated by the other arm of said bell crank to operate said plunger.

4. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means comprising a spring-pressed pawl operated by one arm of said bell crank to intermittently rotate said disk to progressively register the measuring cups with said discharge port, and means operated by the other arm of said bell crank to operate said plunger.

5. A dispensing device comprising a hopper for material to be dispensed, a drive shaft, a central shaft driven by said drive shaft, a discharge port, disk means in said hopper provided with cups for measuring said material, rack means on the bottom face of said disk, a plunger for forcing the material from the cup registering with said discharge port, a bell crank pivotally mounted on said central shaft, means for rocking said bell crank, means engaging said rack and operated by one arm of said bell crank to intermittently rotate said disk to progressively register the measuring cups with said discharge port, and means operated by the other arm of said bell crank to operate said plunger.

6. A dispensing device comprising a hopper for material to be dispensed, a drive shaft, a central shaft driven by said drive shaft, a discharge port, disk means in said hopper provided with cups for measuring said material, rack means on the bottom face of said disk, a plunger for forcing the material from the cup registering with said discharge port, a bell crank pivotally mounted on said central shaft, a crank on said drive shaft for rocking said bell crank, means engaging said rack and operated by one arm of said bell crank to intermittently rotate said disk to progressively register the measuring cups with said discharge port, and means operated by the other arm of said bell crank to operate said plunger.

7. A dispensing device comprising a hopper for material to be dispensed, a drive shaft, a central shaft driven by said drive shaft, a discharge port, disk means in said hopper provided with cups for measuring said material, rack means on the bottom face of said disk, a plunger for forcing the material from the cup registering with said discharge port, a bell crank pivotally mounted on said central shaft, means for rocking said bell crank, means comprising a spring-pressed pawl engaging said rack and operated by one arm of said bell crank to intermittently rotate said disk to progressively register the measuring cups with said discharge port, and means operated by the other arm of said bell crank to operate said plunger.

8. A dispensing device comprising a hopper for material to be dispensed, a drive shaft, a central shaft driven by said drive shaft, a discharge port, disk means in said hopper provided with cups for measuring said material, rack means on the bottom face of said disk, a plunger for forcing the material from the cup registering with said discharge port, a bell crank pivotally mounted on said central shaft, a crank on said drive shaft for rocking said bell crank, means comprising a spring-pressed pawl engaging said rack and operated by one arm of said bell crank to intermittently rotate said disk to progressively register the measuring cups with said discharge port, and means operated by the other arm of said bell crank to operate said plunger.

9. A dispensing device comprising a hopper for material to be dispensed, a drive shaft, a central shaft driven by said drive shaft, agitator means in said hopper operated by said central shaft, a discharge port, disk means in said hopper provided with cups for measuring said material, a plunger for forcing the material from the cup registering with said discharge port, a bell crank pivotally mounted on said central shaft, means for rocking said bell crank, means operated by one arm of said bell crank to intermittently rotate said disk to progressively register the measuring cups with said discharge port, and means operated by the other arm of said bell crank to operate said plunger.

10. A dispensing device comprising a hopper for material to be dispensed, a drive shaft, a central shaft driven by said drive shaft, agitator means in said hopper operated by said central shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means operated by one arm of said bell crank to intermittently rotate said disk to progressively register the measuring cups with said discharge port, and means operated by the other arm of said bell crank to operate said plunger.

11. A dispensing device comprising a hopper for material to be dispensed, a drive shaft, a central shaft driven by said drive shaft, agitator means in said hopper operated by said central shaft, a discharge port, disk means in said hopper provided with cups for measuring said material, a plunger for forcing the material from the cup registering with said discharge port, a bell crank pivotally mounted on said central shaft, means for rocking said bell crank, means comprising a spring-pressed pawl operated by one arm of said bell crank to intermittently rotate said disk to progressively register the measuring cups with said discharge port, and means operated by the other arm of said bell crank to operate said plunger.

12. A dispensing device comprising a hopper for material to be dispensed, a drive shaft, a central shaft driven by said drive shaft, agitator means in said hopper operated by said central shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means comprising a spring-pressed pawl operated by one arm of said bell crank to intermittently rotate said disk to progressively register the measuring cups with said discharge port, and means operated by the other arm of said bell crank to operate said plunger.

13. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, means for rocking said bell crank, means operated by one arm of said bell crank to intermittently rotate said disk to progressively register the measuring cups with said discharge port, means operated by the other arm of said bell crank to operate said plunger, and means for rendering said disk rotating means inoperative.

14. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means operated by one arm of said bell crank to intermittently rotate said disk to progressively register the measuring cups with said discharge port, means operated by the other arm of said bell crank to operate said plunger, and means for rendering said disk rotating means inoperative.

15. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, means for rocking said bell crank, means comprising a spring-pressed pawl operated by one arm of said bell crank to intermittently rotate said disk to progressively register the measuring cups with said discharge port, means operated by the other arm of said bell crank to operate said plunger, and means for releasing the spring action of said pawl for rendering said pawl inoperative to rotate said disk.

16. A dispensing device comprising a hopper for material to be dispensed, a drive shaft, a central shaft driven by said drive shaft, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means comprising a spring-pressed pawl operated by one arm of said bell crank to intermittently rotate said disk to progressively register the measuring cups with said discharge port, means operated by the other arm of said bell crank to operate said plunger, and means for releasing the spring action of said pawl for rendering said pawl inoperative to rotate said disk.

17. A dispensing device comprising a hopper for material to be dispensed, a drive shaft, a central shaft driven by said drive shaft, an agitator carried by the central shaft and provided with yieldably supported agitating fingers, a discharge port, disk means in said hopper provided with cups for measuring said material, a plunger for forcing the material from the cup registering with said discharge port, a bell crank pivotally mounted on said central shaft, means for rocking said bell crank, means operated by one arm of said bell crank to intermittently rotate said disk to progressively register the measuring cups with said discharge port, and means operated by the other arm of said bell crank to operate said plunger.

18. A dispensing device comprising a hopper for material to be dispensed, a drive shaft, a central shaft driven by said drive shaft, an agitator carried by the central shaft and provided with yieldably supported agitating fingers, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means operated by one arm of said bell crank to intermittently rotate said disk to progressively register the measuring cups with said discharge port, and means operated by the other arm of said bell crank to operate said plunger.

19. A dispensing device comprising a hopper for material to be dispensed, a drive shaft, a central shaft driven by said drive shaft, an agitator carried by the central shaft and provided with yieldably supported agitating fingers, a discharge port, disk means in said hopper provided with cups for measuring said material, a plunger for forcing the material from the cup registering with said discharge port, a bell crank pivotally mounted on said central shaft, means for rocking said bell crank, means comprising a spring-pressed pawl operated by one arm of said bell crank to intermittently rotate said disk to progressively register the measuring cups with said discharge port, and means operated by the other arm of said bell crank to operate said plunger.

20. A dispensing device comprising a hopper for material to be dispensed, a drive shaft, a central shaft driven by said drive shaft, an agitator carried by the central shaft and provided with yieldably supported agitating fingers, a discharge port, disk means in said hopper provided with cups for measuring said material, a plunger for forcing the material from the cup registering with said discharge port, a bell crank pivotally mounted on said central shaft, a crank on said drive shaft for rocking said bell crank, means comprising a spring-pressed pawl operated by one arm of said bell crank to intermittently rotate said disk to progressively register the measuring cups with said discharge port, and means operated by the other arm of said bell crank to operate said plunger.

HARRY D. AYARS.